(12) United States Patent
Lee

(10) Patent No.: US 7,915,872 B2
(45) Date of Patent: Mar. 29, 2011

(54) SWITCHING POWER CONVERTERS WITH DIODE REVERSE CURRENT SUPPRESSION

(75) Inventor: Tai Keung Lee, Ma On Shan (HK)

(73) Assignee: Astec International Limited, Kwun Tong, Kowloon (HK)

( * ) Notice: Subject to any disclaimer, the term of this patent is extended or adjusted under 35 U.S.C. 154(b) by 524 days.

(21) Appl. No.: 12/120,309

(22) Filed: May 14, 2008

(65) Prior Publication Data

US 2009/0284241 A1 Nov. 19, 2009

(51) Int. Cl.
G05F 1/10 (2006.01)
G05F 1/40 (2006.01)

(52) U.S. Cl. ......... 323/222; 323/249; 323/259; 323/290

(58) Field of Classification Search .................. 323/222, 323/225, 247, 249, 251, 282, 290
See application file for complete search history.

(56) References Cited

U.S. PATENT DOCUMENTS

| | | | | |
|---|---|---|---|---|
| 5,321,348 A * | 6/1994 | Vinciarelli et al. | ........... | 323/222 |
| 5,543,704 A * | 8/1996 | Thoren | ........... | 323/222 |
| 5,815,386 A * | 9/1998 | Gordon | ........... | 363/50 |
| 6,201,714 B1 * | 3/2001 | Liang | ........... | 363/21.14 |
| 6,377,481 B1 | 4/2002 | Mantov | | |
| 7,579,814 B2 * | 8/2009 | Orr | ........... | 323/259 |
| 2006/0012348 A1 | 1/2006 | Zhao et al. | | |

* cited by examiner

*Primary Examiner* — Jessica Han
(74) *Attorney, Agent, or Firm* — Harness, Dickey & Pierce, P.L.C.

(57) ABSTRACT

A switching power converter includes an input terminal for receiving an input voltage, an output terminal for supplying an output voltage, a coupled choke having a main winding and an auxiliary winding, an output capacitor coupled to the output terminal, a main diode coupled between the auxiliary winding and the output terminal, and a switch having first and second positions. The main and auxiliary windings are connected to be charged by an input voltage when the input voltage is coupled to the input terminal and the switch is in the first position. The auxiliary winding is connected to reverse bias the main diode when the switch is switched from the first position to the second position to thereby suppress reverse recovery current in the main diode. The power converter may further include an auxiliary diode coupled between a common node of the main and auxiliary windings and the output terminal, as well as an inductor in series with the auxiliary diode.

19 Claims, 9 Drawing Sheets

SWITCHING POWER CONVERTERS WITH DIODE REVERSE CURRENT SUPPRESSION

FIELD

The present disclosure relates to switching power converters and suppressing reverse recovery currents in power converter diodes.

BACKGROUND

The statements in this section merely provide background information related to the present disclosure and may not constitute prior art.

Many power supplies use fast switching diodes to rectify the output voltage of the power supply. In general, diodes allow current to flow in one direction through the diode when a forward bias voltage is applied across the diode. When a reverse bias voltage is applied across the diode, the diode should act as an open switch and prevent current from flowing in the opposite direction.

Figure 1:
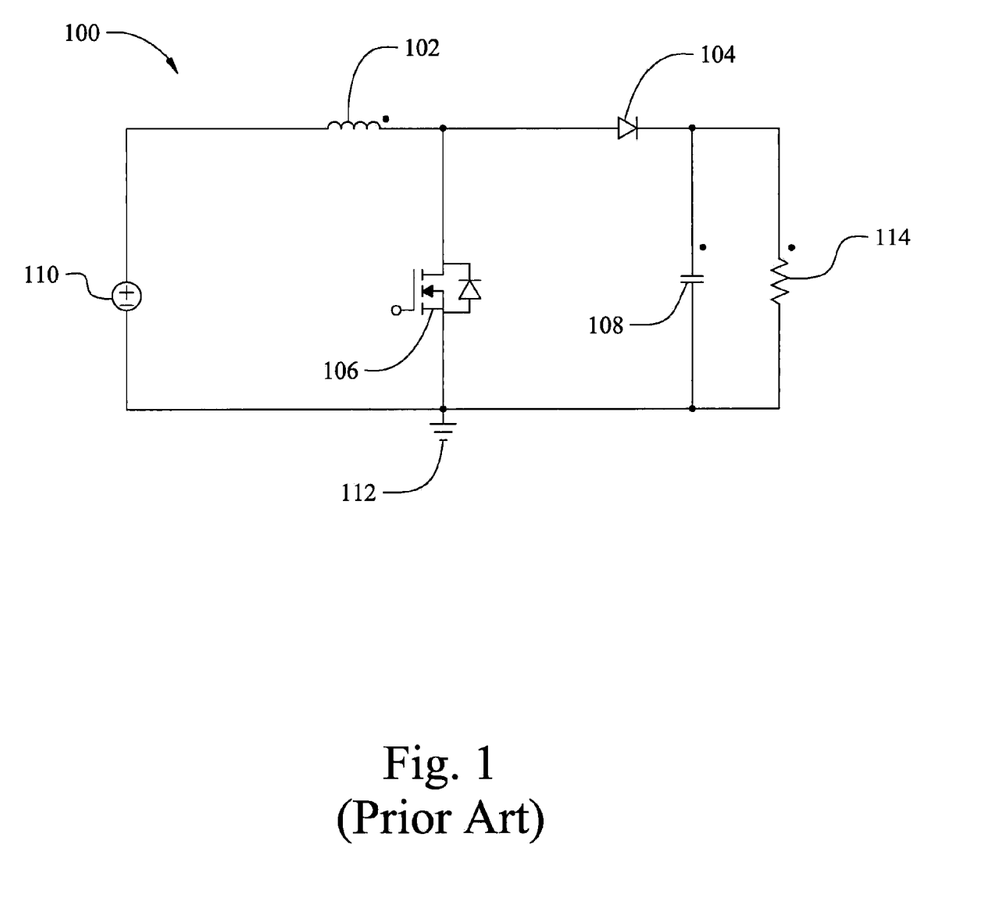
FIG. 1 is a circuit diagram of a prior art boost converter.

FIG. 1 illustrates a conventional boost converter, which is indicated generally by reference numeral 100. The converter 100 includes an inductor 102, a diode 104, a switch 106 and an output capacitor 108. The operation of a conventional boost converter is well known to those skilled in the art and will therefore be explained only briefly herein. In use, a DC input voltage 110 is applied between the inductor 102 and a reference node 112 (also referred to as ground). The switch 106 opens and closes at a high frequency. When the switch 106 is closed, current flows from the DC input voltage 110, through the inductor 102 and the switch 106, to ground 112. When the switch 106 opens, current flows through the inductor 102 and the diode 104 to charge the output capacitor 108 and supply power to a load 114. When the switch 106 closes again, the capacitor 108 discharges current to the load 114. During this time, the diode 104 should prevent current from flowing back toward the switch 106.

However, the high switching frequency of modern power supplies can result in a large change in voltage across the diode 104 as a function of time (dv/dt). This leads to a brief time during which a reverse current flows through the diode 104 (from the cathode to the anode). This reverse current is known in the art as diode reverse recovery current.

Figure 2:
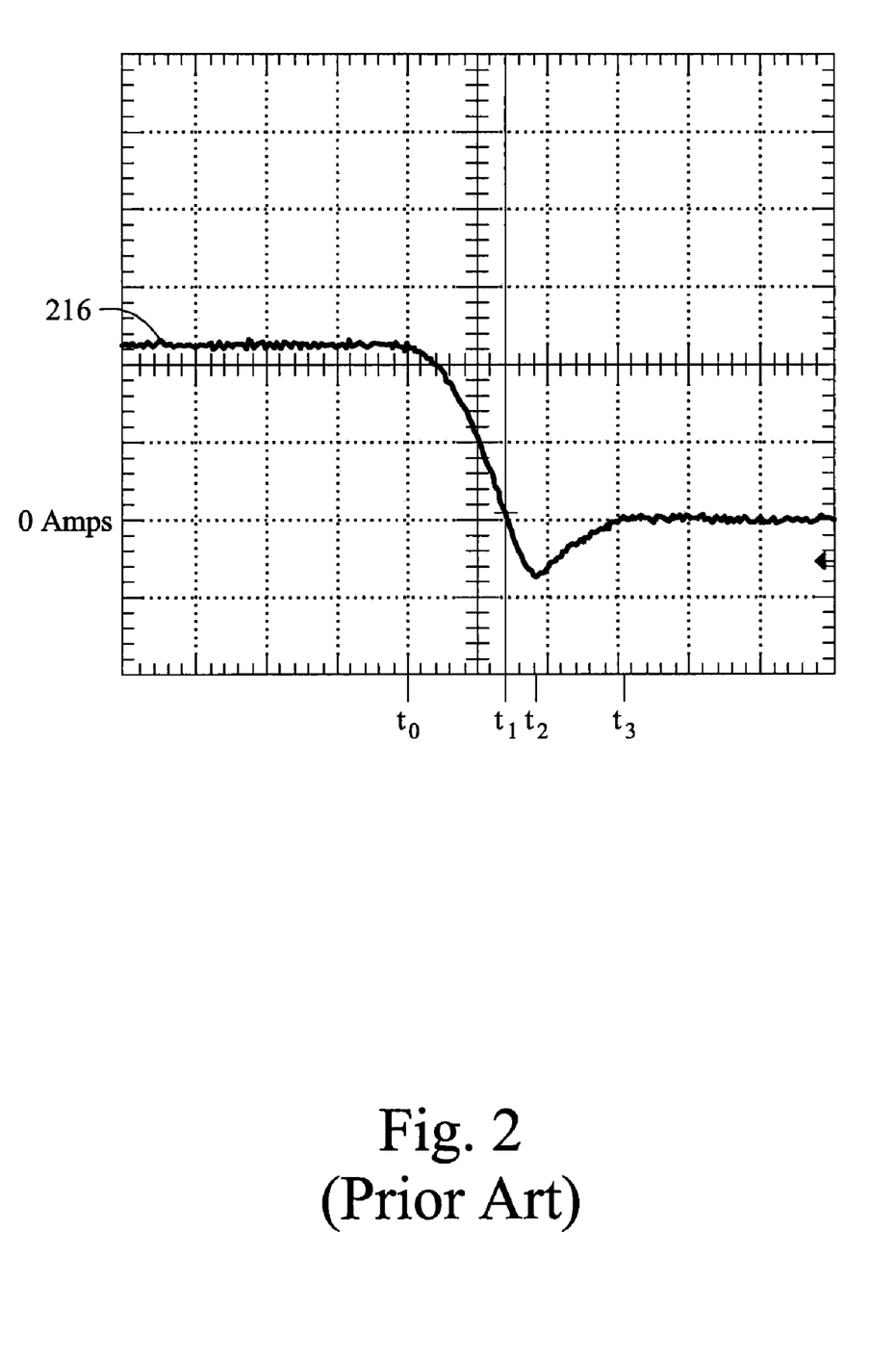
FIG. 2 is a graph illustrating the diode reverse recovery current in the boost converter of FIG. 1.

FIG. 2 illustrates the current 216 flowing through the diode 104 before and after the switch position changes from open to closed at time t0. As shown in FIG. 2, the current decreases to zero amps at time t1. At that point, the current becomes negative and begins to flow in the opposite direction, resulting in a reverse recovery current that peaks at time t2. The reverse recovery current then decreases back to zero amps at time t3.

The reverse recovery current increases the electromagnetic interference (EMI) generated by the converter 100. The reverse recovery spike illustrated in FIG. 2 also limits the switching frequency of the converter 100 and requires use of a more robust and hence more expensive diode 104.

Figure 3:
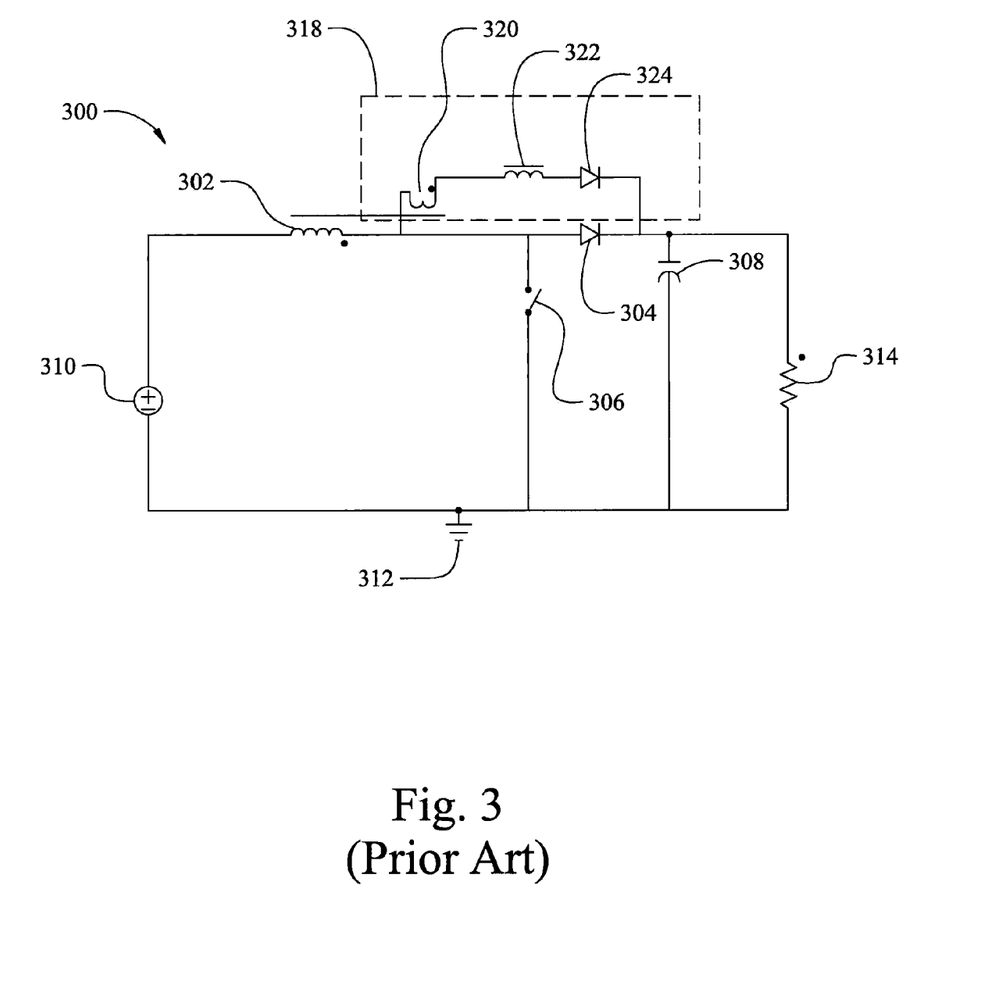
FIG. 3 is a circuit diagram of a prior art boost converter employing one approach for limiting diode reverse recovery current.

FIG. 3 illustrates a boost converter 300 employing one known method for suppressing diode reverse recovery current. The boost converter 300 includes a main winding 302, a main diode 304, a switch 306, and an output capacitor 308. An input voltage 310 is coupled between the main winding and ground 312 so that an output voltage can be supplied to a load 314. The boost converter 300 includes additional elements, generally indicated by reference number 318, to limit diode reverse recovery current. Specifically, the additional elements 318 include an auxiliary winding 320 (coupled to the main winding 302) connected in series with an inductor 322 and an auxiliary diode 324.

When the switch 306 is closed, current flows through the main winding 302 and the switch 306 to ground 312. When the switch 306 opens, current initially flows through the main winding 302 and the main diode 304 to the output capacitor 308 and load 314. This results in a voltage across the additional elements 318 that forward biases the auxiliary diode 324 and causes current to flow through the additional elements 318. This current increases until all current from the main winding 302 is channeled through the additional elements 318. This diversion of current from the main diode 304 to the auxiliary diode 324 is completed before the switch 306 closes to begin the next cycle. Therefore, when the switch 306 closes, no current is flowing through the main diode 304 and the reverse recovery current in the main diode 304 is greatly decreased. Additionally, the leakage inductance of the coupled main and auxiliary windings 302, 320 prevent the current flowing through the additional elements 318 from changing rapidly. As a result, the reverse recovery current through the auxiliary diode 324 is limited.

Figure 4:
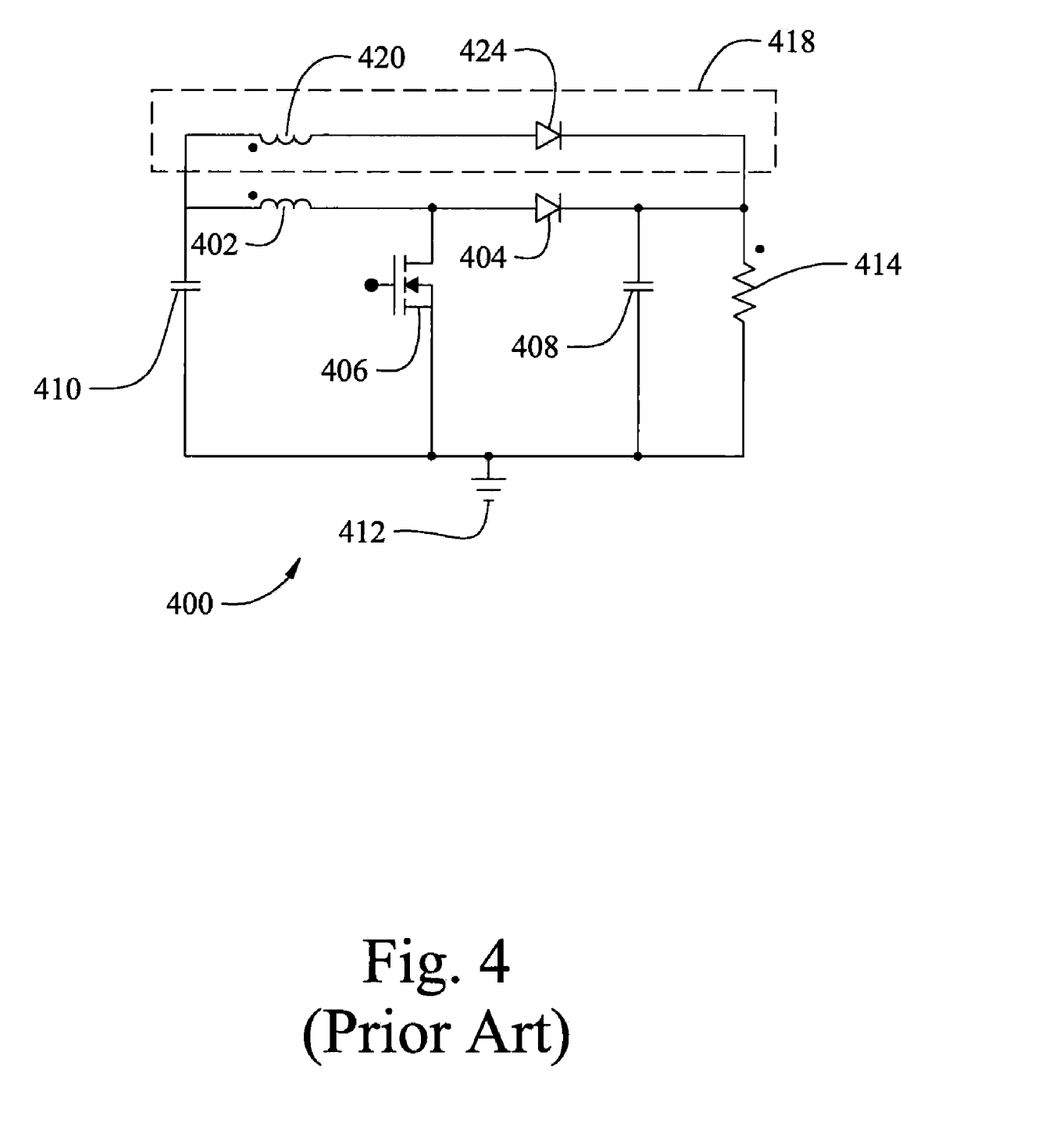
FIG. 4 is a circuit diagram of a prior art boost converter employing another approach for limiting diode reverse recovery current.

FIG. 4 illustrates a boost converter 400 employing another known method for suppressing diode reverse recovery current. The boost converter 400 includes a main winding 402, a main diode 404, a switch 406, and an output capacitor 408. An input voltage 410 is coupled between the main winding 402 and ground 412 so that an output voltage can be supplied to a load 414. The boost converter 400 also includes additional elements, generally indicated by reference number 418, to limit diode reverse recovery current. Specifically, the additional elements 418 include an auxiliary winding 420 (coupled to the main winding 402) connected in series with an auxiliary diode 424. The auxiliary winding 420 has more turns than the main winding 402. Additionally, the auxiliary winding 420 and the auxiliary diode 424 are connected to the input voltage 410 in parallel with the main winding 402 and the main diode 404.

When the switch 406 is closed, current flows through the main winding 402 and the switch 406 to ground. When the switch 406 opens, current initially flows through the main winding 402 and the main diode 404 to the output capacitor 408 and load 414. Current then begins to flow, at an increasing rate, through the additional elements 418 until all current from the voltage source 410 is channeled through the additional elements 418. This diversion of current from the main diode 404 to the auxiliary diode 424 occurs before the switch 406 closes to begin the next cycle. Therefore, when the switch closes, no current is flowing through the main diode 404 and the reverse recovery current in the main diode 404 is greatly decreased. Additionally, various factors including the leakage inductance of the coupled main and auxiliary windings 402, 420 prevent the current flowing through the additional elements 418 from changing rapidly. As a result the reverse recovery current through the auxiliary diode 424 is limited.

Although the converters 300, 400 of FIGS. 3 and 4 are useful for certain applications, the present inventor has recognized a need for new approaches to suppressing diode reverse recovery current in switching power converters.

SUMMARY

According to one aspect of the present disclosure, a switching power converter includes at least one input terminal for receiving an input voltage, at least one output terminal for supplying an output voltage, a coupled choke having a main winding and an auxiliary winding, an output capacitor coupled to the output terminal, a main diode coupled between the auxiliary winding and the output terminal, and a switch having at least first and second positions. The main and auxiliary windings are connected to be charged by an input voltage when the input voltage is coupled to the input terminal and the switch is in the first position. The auxiliary winding is connected to reverse bias the main diode when the input voltage is coupled to the input terminal and the switch is switched from the first position to the second position to thereby suppress reverse recovery current in the main diode.

The power converter may also include an auxiliary diode coupled between a common node of the main and auxiliary windings and the output terminal such that a current through the auxiliary diode increases as a current through the main diode decreases when the input voltage is coupled to the input terminal and the switch is switched from the first position to the second position. In some embodiments, the auxiliary diode is directly connected to the auxiliary winding. In other embodiments, an inductor (which may be a saturable inductor) is coupled between the auxiliary diode and the auxiliary winding.

Further aspects and features of the present disclosure will be in part apparent and in part pointed out below. It should be understand that such aspects and features can be implemented individually, or in combination with other aspects or features, in any given implementation of the teachings herein.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure nor its applications or uses.

According to one aspect of the present disclosure, and as noted above, a switching power converter includes at least one input terminal for receiving an input voltage, at least one output terminal for supplying an output voltage, a coupled choke having a main winding and an auxiliary winding, an output capacitor coupled to the output terminal, a main diode coupled between the auxiliary winding the output terminal, and a switch having at least first and second positions. The main and auxiliary windings are connected to be charged by an input voltage when the input voltage is coupled to the input terminal and the switch is in the first position. The auxiliary winding is connected to reverse bias the main diode when the input voltage is coupled to the input terminal and the switch is switched from the first position to the second position to thereby suppress reverse recovery current in the main diode.

The switching power converter may also include an auxiliary diode coupled between the auxiliary winding and the output terminal such that a current through the auxiliary diode increases as a current through the main diode decreases when the input voltage is coupled to the input terminal and the switch is switched from the first position to the second position. In some embodiments, the auxiliary diode is directly connected to the auxiliary winding. In other embodiments, an inductor (which may be a saturable inductor) is coupled between the auxiliary diode and the auxiliary winding.

Some examples of switching power converters incorporating these aspects of the present disclosure will now be described with reference to FIGS. 5-10. It should be understood however, that the teachings set forth herein can be implemented in other ways and are therefore not limited to the specific examples shown in FIGS. 5-10.

Figure 5:
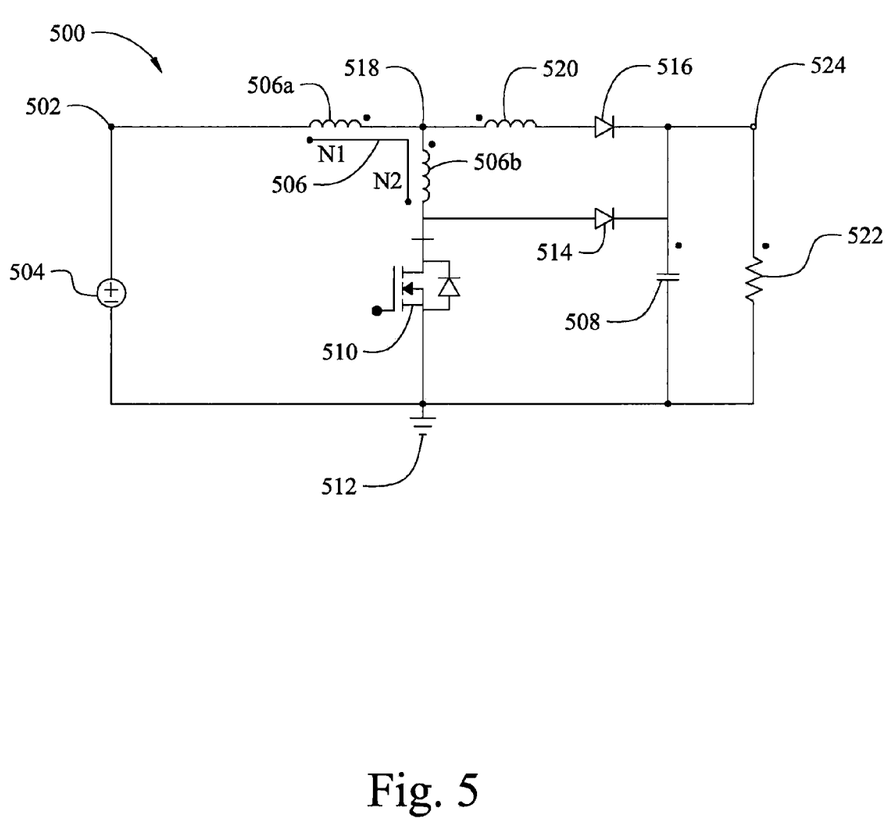
FIG. 5 is a circuit diagram of a boost converter configured to suppress diode reverse recovery current according to one embodiment of the present disclosure.

FIG. 5 illustrates a boost converter 500 having an input terminal 502 for receiving an input voltage 504 and a coupled choke 506 having a main winding 506a and an auxiliary winding 506b. As shown in FIG. 5, one terminal of the main winding 506a is coupled to the input terminal 502, and another terminal of the main winding 506a is coupled to a terminal of the auxiliary winding 506b. The power converter 500 further includes an output capacitor 508, at least one switch 510 coupled between one terminal of the auxiliary winding 506b and a reference node 512 (also referred to as ground), a main diode 514 having an anode coupled to one terminal of the auxiliary winding 506b and a cathode coupled to the output capacitor 508, and an auxiliary diode 516 coupled between a common node 518 of the main and auxiliary windings 506a, 506b and the output capacitor 508.

In the specific embodiment of FIG. 5, the boost converter 500 also includes an inductor 520 coupled between the common node 518 and the auxiliary diode 516. Although not shown in FIG. 5, a snubber circuit can also be employed with the inductor 520 to suppress voltage spikes across the auxiliary diode 516.

FIG. 5 also illustrates a load 522 connected to an output terminal 524 of the boost converter 500, in parallel with the output capacitor 508. The load 522 may be any type of electrical device, including another power converter.

In the particular embodiment of FIG. 5 (and the embodiments shown in FIGS. 9 and 10), the auxiliary winding has less turns than the main winding.

The main and auxiliary diodes 514, 516 can each be any suitable type of diode including a general diode, a Schottky diode, an ultra-fast diode, etc. Because reverse recovery current is suppressed in the converter 500 of FIG. 5, as further explained below, the main and auxiliary diodes 514, 516 can be low forward voltage drop diodes to increase the efficiency of the converter 500.

Figure 6:
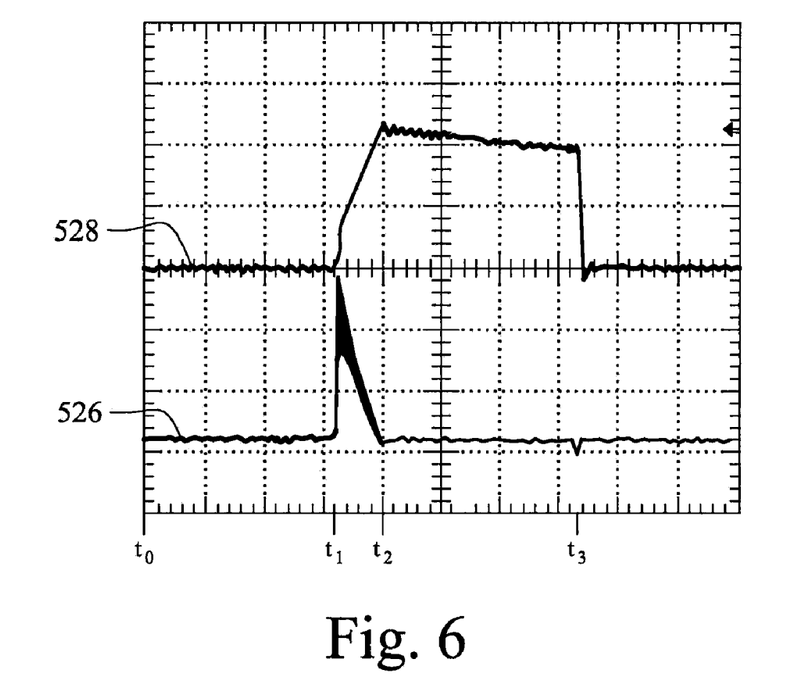
FIGS. 6-8 are graphs of the main and/or auxiliary diode currents for the converter of FIG. 5.
Figure 7:
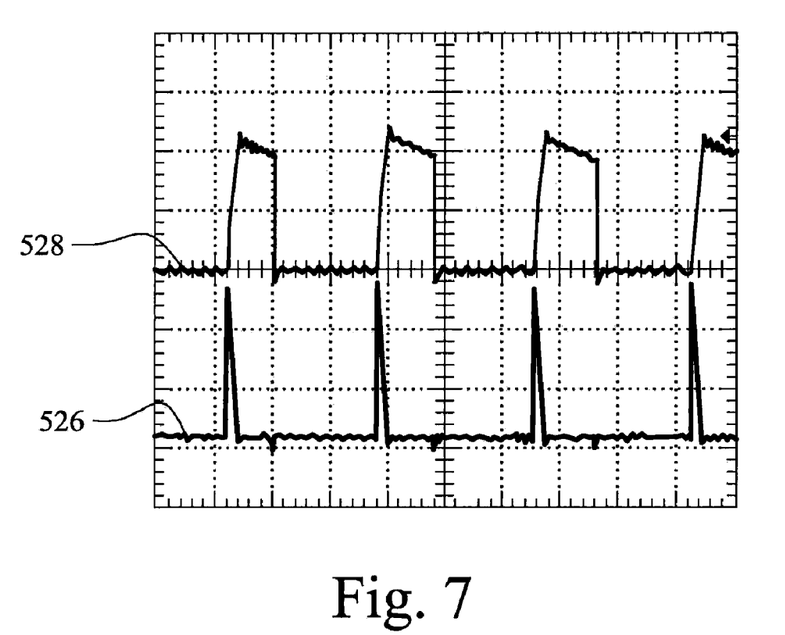
Figure 8:
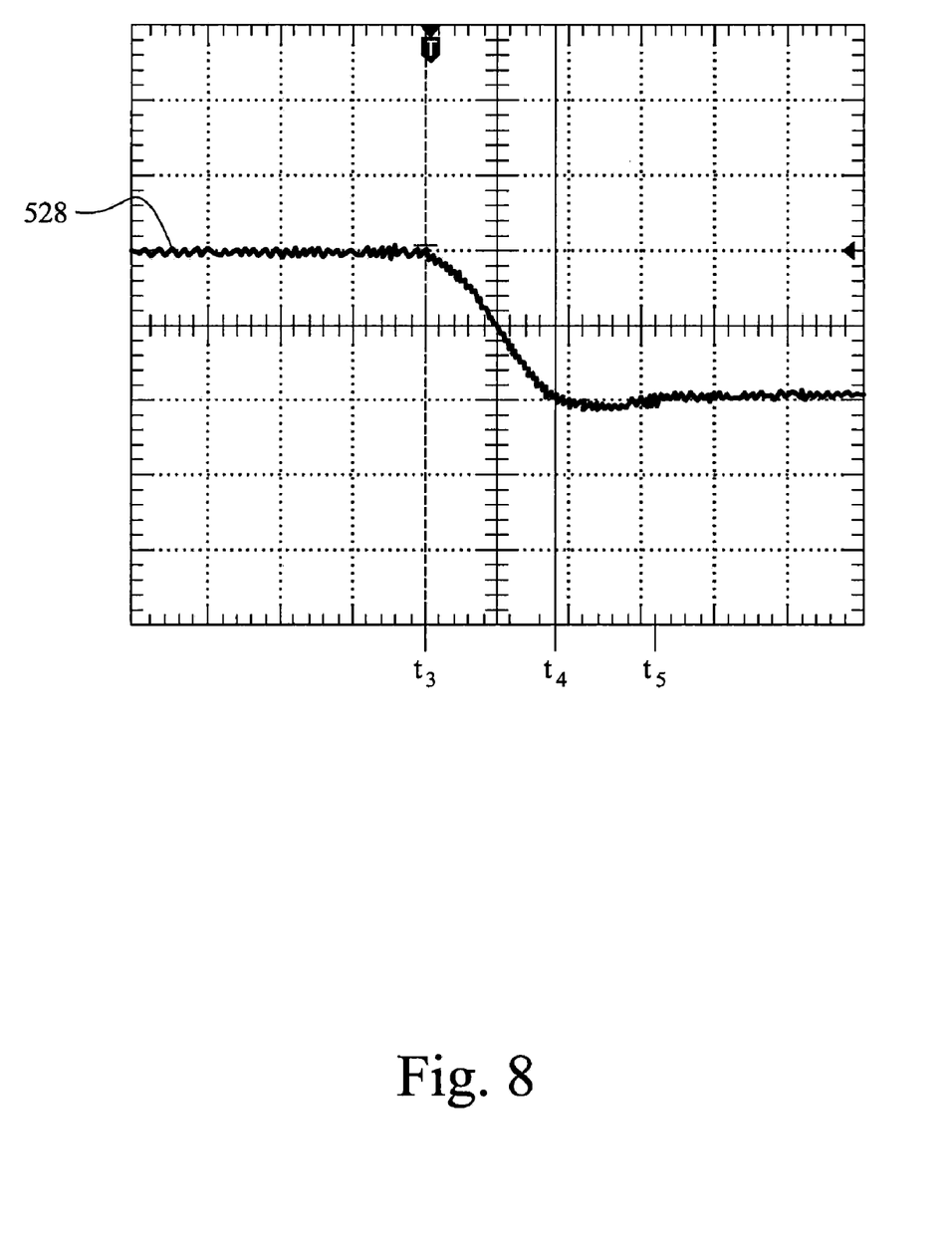

Operation of the power converter 500 of FIG. 5 will now be explained with reference to FIGS. 6-8, which illustrate the current 526 through the main diode 514 and/or the current 528 through the auxiliary diode 516 during operation of the power converter 500.

Initially, when the switch 510 is closed from time to time t1, current flows from the input voltage source 504 to ground 512 through the main winding 506a, the auxiliary winding 506b and the switch 510. During this time, the main winding 506a and the auxiliary winding 506b store energy and no current flows through the main diode 514 or the auxiliary diode 516, as indicated in FIG. 6.

When the switch 510 opens at time t1, most or all current provided to the output terminal 524 flows through the main winding 506a, the auxiliary winding 506b and the main diode 514. Some of this current will flow through and charge the output capacitor 508, with the remaining current provided to the load 522. At time t1, the leakage inductance of the coupled choke 506 and the inductor 520 prevents or inhibits current flow through the auxiliary diode 516. However, between times t1 and t2, a voltage increases across the auxiliary winding 506b which causes the main diode 514 to become reverse biased. As a result, and as shown in FIGS. 6 and 7, the auxiliary diode current 528 steadily increases between times t1 and t2 as the main diode current 526 steadily decreases. By time t2, all current from the main winding 506a is channeled through the auxiliary diode 516, and the main diode current 526 is approximately zero amps.

This diversion of current from the main diode 514 to the auxiliary diode 516 is completed before the switch 510 closes again at time t3. Therefore, the main diode 526 current is already at zero amps when the switch 510 closes at time t3, and reverse recovery current through the main diode is suppressed or eliminated. Further, the leakage inductance of the coupled choke 506 and the inductor 520 prevents the auxiliary diode current 528 from quickly changing. As a result, reverse recovery current through the auxiliary diode 516 is also limited. As shown in FIG. 8, the auxiliary diode current 528 decreases gradually from time t3, when the switch 510 closes, to zero amps at time t4. Between times t4 and t5, the auxiliary diode current 528 dips briefly below zero amps. This reverse recovery current, however, is limited in duration and gradual, i.e., it is not a spike. Overall, the reverse recovery current through the auxiliary diode 516 is limited in the boost converter 500 of FIG. 5.

Reducing or suppressing reverse recovery current in switching power converters provides many benefits. It results in a power supply with reduced EMI because or the elimination and/or reduction of diode reverse recovery current spikes. Further, the discontinuous mode operation of the main diode 514 in the circuit of FIG. 5 allows for a higher switching frequency and a smaller magnetic power component. Additionally, a main diode with a smaller forward voltage drop can also be used. All of these benefits allow the converter to be more efficient and have a higher power density.

Figure 9:
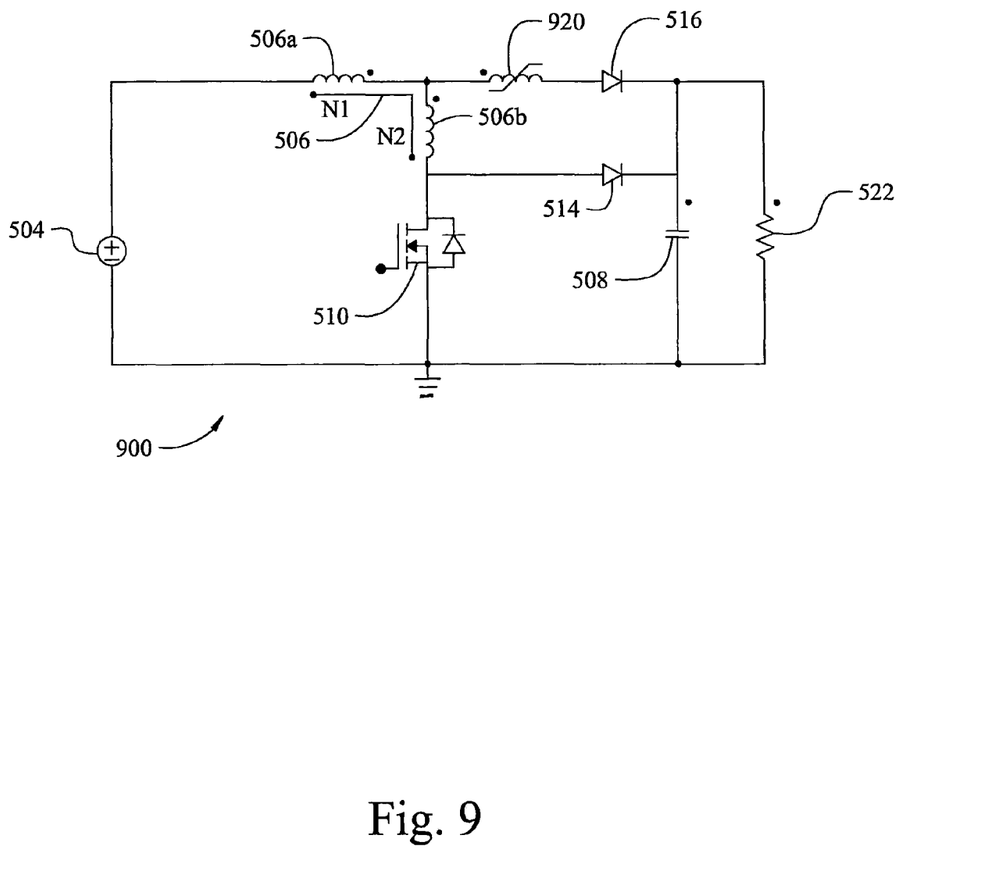
FIG. 9 is a circuit diagram of a boost converter employing a saturable inductor according to another embodiment of this disclosure.

FIG. 9 illustrates a boost converter 900 according to another embodiment of the present disclosure. The converter 900 is identical to the converter 500 of FIG. 5 except that the inductor 520 has been replaced with a saturable inductor 920. At low currents, a saturable inductor operates in the same manner as a standard inductor. However, as current increases above a certain point (i.e., the critical saturation current), a saturable inductor becomes saturated and its characteristics change. Above that point the energy stored in the saturable inductor remains constant and the inductance of the saturable inductor drops to approximately zero. Employing the saturable inductor 920 in the converter 900 of FIG. 9 helps suppress voltage spikes across the auxiliary diode 516.

Figure 10:
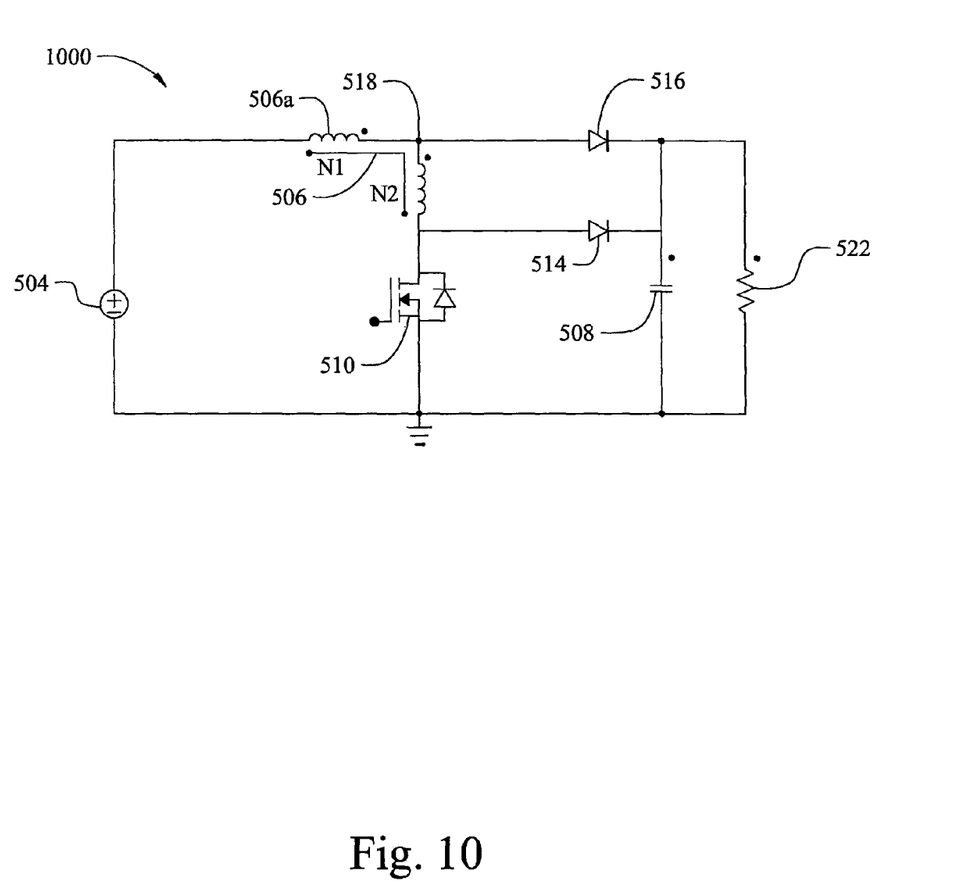
FIG. 10 is a circuit diagram of a boost converter that does not employ an inductor in series with the auxiliary diode according to yet another embodiment of this disclosure.

FIG. 10 illustrates a boost converter 1000 according to another embodiment of the present disclosure. The converter 1000 is identical to the converter 500 of FIG. 5 except that the inductor 520 of FIG. 5 has been eliminated. Therefore, the auxiliary diode 516 is directly connected to the common node 518 in the converter 1000 of FIG. 10. The converter 1000 generally operates in the same manner as the converter 500 of FIG. 5. However, the forward current through the auxiliary diode 516 is initially limited by only the leakage inductance of the coupled choke 506. Similarly, reverse recovery current in the auxiliary diode 516 is limited by the leakage inductance of the coupled choke 506. For this configuration, the coupled choke 506 should be selected to provide the leakage inductance necessary for proper operation of the converter 1000.

Although the teachings of the present disclosure have been explained above in the context of boost converters, it should be understood these teachings are not so limited and can be applied to other converter topologies.

What is claimed is:

1. A switching power converter comprising:
   at least one input terminal for receiving an input voltage;
   a coupled choke having a main winding and an auxiliary winding, the main and auxiliary windings each having first and second terminals, the first terminal of the main winding coupled to the input terminal, the second terminal of the main winding coupled to the first terminal of the auxiliary winding;
   an output capacitor;
   at least one switch coupled between the second terminal of the auxiliary winding and a reference node;
   a main diode having an anode coupled to the second terminal of the auxiliary winding and a cathode coupled to the output capacitor; and
   an auxiliary diode coupled between the first terminal of the auxiliary winding and the output capacitor.

2. The power converter of claim 1 wherein an anode of the auxiliary diode is connected to the first terminal of the auxiliary winding.

3. The power converter of claim 1 further comprising an inductor coupled between the first terminal of the auxiliary winding and an anode of the auxiliary diode.

4. The power converter of claim 3 wherein the inductor is a saturable inductor.

5. The power converter of claim 1 wherein the auxiliary winding has less turns than the main winding.

6. The power converter of claim 1 wherein at least one of the main diode and the auxiliary diode is a Schottky diode.

7. The power converter of claim 1 wherein the main and auxiliary diodes are Schottky diodes.

8. The power converter of claim 1 wherein the switch is a MOSFET.

9. A switching power converter comprising:
   at least one input terminal for receiving an input voltage;
   at least one output terminal for supplying an output voltage;
   a coupled choke having a main winding and an auxiliary winding;
   an output capacitor coupled to the output terminal;
   a main diode coupled between the auxiliary winding and the output terminal; and
   a switch having at least first and second positions;
   wherein the main and auxiliary windings are connected to be charged by an input voltage when the input voltage is coupled to the input terminal and the switch is in the first position,
   and wherein the auxiliary winding is connected to reverse bias the main diode when the input voltage is coupled to the input terminal and the switch is switched from the first position to the second position to thereby suppress reverse recovery current in the main diode.

10. The power converter of claim 9 further comprising an auxiliary diode coupled between a common node of the main and auxiliary windings and the output terminal, wherein a current through the auxiliary diode increases as a current through the main diode decreases when the input voltage is coupled to the input terminal and the switch is switched from the first position to the second position.

11. The power converter of claim 10 wherein the auxiliary winding includes a first terminal coupled to the auxiliary diode and a second terminal coupled to the main diode.

12. The power converter of claim 10 wherein the switch is closed in the first position and open in the second position.

13. The power converter of claim 10 further comprising an inductor connected in series with the auxiliary diode.

14. The power converter of claim 13 wherein the inductor is a saturable inductor.

15. The power converter of claim 10 wherein at least one of the main diode and the auxiliary diode is a Schottky diode.

16. The power converter of claim 10 wherein the main and auxiliary diodes are Schottky diodes.

17. The power converter of claim 10 wherein the auxiliary winding has less turns than the main winding.

18. The power converter of claim 10 wherein the switch is a MOSFET.

19. The power converter of claim 10 wherein the converter is a boost converter.

* * * * *